United States Patent
Cataquis et al.

(10) Patent No.: US 11,936,694 B2
(45) Date of Patent: Mar. 19, 2024

(54) CROSS-DOMAIN ROUTING BASED ON SESSION INITIATION PROTOCOL INFORMATION

(71) Applicant: T-Mobile USA, Inc., Bellevue, WA (US)

(72) Inventors: Jason Cataquis, Bellevue, WA (US); Dennis Romero, Mine Hill, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/530,353

(22) Filed: Nov. 18, 2021

(65) Prior Publication Data

US 2023/0156049 A1 May 18, 2023

(51) Int. Cl.
| | |
|---|---|
| *H04L 65/1069* | (2022.01) |
| *H04L 61/4557* | (2022.01) |
| *H04L 65/1016* | (2022.01) |
| *H04L 65/1045* | (2022.01) |
| *H04L 65/1104* | (2022.01) |

(52) U.S. Cl.
CPC ...... *H04L 65/1069* (2013.01); *H04L 61/4557* (2022.05); *H04L 65/1016* (2013.01); *H04L 65/1045* (2022.05); *H04L 65/1104* (2022.05)

(58) Field of Classification Search
CPC ............ H04L 65/1069; H04L 65/1104; H04L 65/1045; H04L 65/1016; H04L 61/4557
See application file for complete search history.

(56) References Cited

U.S. PATENT DOCUMENTS

| | | |
|---|---|---|
| 5,506,897 A | 4/1996 | Moore et al. |
| 6,683,881 B1 | 1/2004 | Mijares et al. |
| 6,917,612 B2 | 7/2005 | Foti et al. |
| 6,987,781 B1 | 1/2006 | Miller et al. |
| 6,996,087 B2 | 2/2006 | Ejzak |
| 7,031,747 B2 | 4/2006 | Cyr et al. |
| 7,154,864 B2 | 12/2006 | Costa-Requena et al. |
| 7,245,611 B2 | 7/2007 | Narasimhan et al. |
| 7,308,267 B2 | 12/2007 | Goering et al. |
| 7,548,743 B2 | 6/2009 | Cai et al. |
| 7,558,254 B2 | 7/2009 | Haase et al. |
| 7,580,516 B2 | 8/2009 | Long et al. |
| 7,640,036 B2 | 12/2009 | Kallio |

(Continued)

FOREIGN PATENT DOCUMENTS

EP 2293512 B1 1/2016

*Primary Examiner* — John A Follansbee
*Assistant Examiner* — Zonghua Du
(74) *Attorney, Agent, or Firm* — Perkins Coie LLP (57) ABSTRACT

Methods, devices, and system related to cross-domain routing of communication session requests in Internet Protocol (IP) Multimedia Subsystem are disclosed. In one example aspect, a method for routing a call initiated in an IP Multimedia Subsystem (IMS) includes receiving, by a Breakout Gateway Control Function (BGCF) node operating in a first domain, a first message from a caller requesting an establishment of a communication session. The method includes determining, by the BGCF node based on header information of the first message, that the caller is located in a second domain different than the first domain, and generating, by the BGCF node, a second message based on a preconfigured rule for the second domain.

20 Claims, 4 Drawing Sheets

(56) References Cited

U.S. PATENT DOCUMENTS

| | | |
|---|---|---|
| 7,649,881 B2 | 1/2010 | Casey |
| 7,668,183 B2 | 2/2010 | Calme et al. |
| 7,702,342 B2 | 4/2010 | Duan |
| 7,804,820 B2 | 9/2010 | Shi et al. |
| 7,843,902 B2 | 11/2010 | Imbimbo et al. |
| 7,852,838 B2 | 12/2010 | Miller et al. |
| 7,881,288 B2 | 2/2011 | Noldus et al. |
| 7,898,990 B2 | 3/2011 | Kallio et al. |
| 7,969,967 B2 | 6/2011 | Douglas et al. |
| 7,974,295 B2 | 7/2011 | Tuohino et al. |
| 7,975,037 B2 | 7/2011 | Tai et al. |
| 7,996,007 B2 | 8/2011 | Bantukul |
| 8,036,366 B2 | 10/2011 | Chu |
| 8,050,253 B2 | 11/2011 | Kalyanpur et al. |
| 8,081,586 B2 | 12/2011 | Kiss |
| 8,086,519 B2 | 12/2011 | Mylet et al. |
| 8,130,639 B1 | 3/2012 | Robbins |
| 8,145,190 B2 | 3/2012 | Caldwell et al. |
| 8,160,559 B2 | 4/2012 | Buckley et al. |
| 8,244,905 B2 | 8/2012 | Bhatt et al. |
| 8,254,553 B2 | 8/2012 | Agarwal et al. |
| 8,254,877 B2 | 8/2012 | Edge et al. |
| 8,305,210 B2 | 11/2012 | Bakker et al. |
| 8,325,708 B2 | 12/2012 | Lim et al. |
| 8,335,221 B2 | 12/2012 | Shi |
| 8,363,572 B2 | 1/2013 | Potts et al. |
| 8,374,172 B2 | 2/2013 | Jana et al. |
| 8,423,758 B2 | 4/2013 | Singhal |
| 8,428,032 B1 | 4/2013 | Pankajakshan et al. |
| 8,446,899 B2 | 5/2013 | Lei et al. |
| 8,456,274 B2 | 6/2013 | Modiano |
| 8,472,431 B2 | 6/2013 | Siegel et al. |
| 8,520,615 B2 | 8/2013 | Mehta et al. |
| 8,543,107 B1 | 9/2013 | Bertz et al. |
| 8,582,566 B2 | 11/2013 | Bae et al. |
| 8,606,222 B2 | 12/2013 | Agarwal et al. |
| 8,615,217 B2 | 12/2013 | Ravishankar et al. |
| 8,630,651 B2 | 1/2014 | Lau |
| 8,644,301 B2 | 2/2014 | Tamhankar et al. |
| 8,700,038 B2 | 4/2014 | Wang et al. |
| 8,761,764 B2 | 6/2014 | Mccann et al. |
| 8,782,255 B2 | 7/2014 | Thiebaut et al. |
| 8,787,362 B2 | 7/2014 | Atarius et al. |
| 8,799,440 B2 | 8/2014 | Zhou et al. |
| 8,862,718 B2 | 10/2014 | Naim et al. |
| 8,886,209 B2 | 11/2014 | Shaw et al. |
| 8,898,063 B1 | 11/2014 | Sykes et al. |
| 8,942,747 B2 | 1/2015 | Marsico |
| 9,025,553 B2 | 5/2015 | Stille |
| 9,042,378 B2 | 5/2015 | Rasanen |
| 9,043,451 B2 | 5/2015 | Bantukul et al. |
| 9,071,483 B1 | 6/2015 | Mayhan |
| 9,185,139 B2 | 11/2015 | Holbrook et al. |
| 9,185,545 B2 | 11/2015 | Yeoum et al. |
| 9,215,734 B2 | 12/2015 | Bakker et al. |
| 9,264,299 B1 | 2/2016 | Palmer et al. |
| 9,288,317 B2 | 3/2016 | Siminoff |
| 9,379,898 B2 | 6/2016 | Russell et al. |
| 9,380,558 B2 | 6/2016 | Mathias et al. |
| 9,386,407 B2 | 7/2016 | Malin |
| 9,392,070 B2 | 7/2016 | Boberg et al. |
| 9,392,124 B2 | 7/2016 | Cleary et al. |
| 9,392,436 B2 | 7/2016 | Xu et al. |
| 9,402,212 B2 | 7/2016 | Mutikainen et al. |
| 9,426,299 B2 | 8/2016 | Evans |
| 9,521,015 B2 | 12/2016 | Sylvain et al. |
| 9,686,284 B2 | 6/2017 | Shah et al. |
| 9,729,705 B2 | 8/2017 | Ligeret et al. |
| 9,781,655 B2 | 10/2017 | Lee et al. |
| 9,832,234 B2 | 11/2017 | Abtin et al. |
| 9,867,090 B2 | 1/2018 | Hallenstal et al. |
| 9,924,344 B1 | 3/2018 | Datar |
| 10,027,719 B2 | 7/2018 | Österlund et al. |
| 10,028,175 B2 | 7/2018 | Sharma et al. |
| 10,044,769 B2 | 8/2018 | Mufti et al. |
| 10,055,791 B2 | 8/2018 | Baker |
| 10,135,880 B2 | 11/2018 | Bonkowski |
| 10,148,703 B2 | 12/2018 | Mufti et al. |
| 10,341,396 B2 | 7/2019 | Kumar Selvaraj |
| 10,375,127 B2 | 8/2019 | Filart |
| 10,455,453 B2 | 10/2019 | Mufti et al. |
| 10,560,570 B2 | 2/2020 | Bot et al. |
| 10,827,017 B2 | 11/2020 | Alam |
| 10,863,025 B2 | 12/2020 | Filart |
| 10,863,034 B2 | 12/2020 | Bianco et al. |
| 2004/0072593 A1 | 4/2004 | Robbins et al. |
| 2004/0255137 A1 | 12/2004 | Ying |
| 2006/0234703 A1 | 10/2006 | Wuthnow et al. |
| 2006/0248586 A1 | 11/2006 | Delaney et al. |
| 2007/0238472 A1 | 10/2007 | Wanless |
| 2007/0258575 A1* | 11/2007 | Douglas ............... H04Q 3/005 379/221.13 |
| 2008/0032695 A1 | 2/2008 | Zhu et al. |
| 2008/0137643 A1 | 6/2008 | Khanchandani et al. |
| 2008/0267169 A1 | 10/2008 | Mundra et al. |
| 2009/0041223 A1 | 2/2009 | Agarwal et al. |
| 2009/0047922 A1 | 2/2009 | Buckley et al. |
| 2010/0050234 A1 | 2/2010 | Lindholm et al. |
| 2010/0157986 A1 | 6/2010 | Rao et al. |
| 2010/0232403 A1 | 9/2010 | Qiu et al. |
| 2011/0026510 A1 | 2/2011 | Matsumura et al. |
| 2011/0161505 A1 | 6/2011 | Siegel et al. |
| 2011/0249666 A1 | 10/2011 | Holbrook et al. |
| 2011/0310884 A1 | 12/2011 | Arauz-Rosado |
| 2012/0157094 A1 | 6/2012 | Cheng et al. |
| 2013/0250942 A1* | 9/2013 | Khan ................. H04L 67/59 370/352 |
| 2016/0248814 A1* | 8/2016 | Mufti ................. H04L 69/24 |
| 2017/0164144 A1 | 6/2017 | Panchabhai et al. |
| 2017/0244663 A1* | 8/2017 | Ku ................. H04L 61/4557 |
| 2017/0366961 A1 | 12/2017 | Sabeur |
| 2017/0374195 A1 | 12/2017 | Siminoff |
| 2018/0337851 A1* | 11/2018 | Smithson ............ H04L 45/52 |
| 2018/0343343 A1* | 11/2018 | Filart ................. H04L 65/1104 |
| 2019/0068785 A1* | 2/2019 | Cañas ................. H04L 65/1016 |
| 2019/0116268 A1* | 4/2019 | Li ..................... H04L 65/1016 |
| 2019/0364101 A1 | 11/2019 | Ramakrishnan et al. |
| 2019/0379711 A1 | 12/2019 | Sood et al. |
| 2020/0045168 A1 | 2/2020 | Sinha |
| 2020/0092688 A1 | 3/2020 | Piscopo et al. |
| 2020/0146080 A1 | 5/2020 | Bot et al. |
| 2020/0175590 A1 | 6/2020 | Huo |
| 2021/0029659 A1 | 1/2021 | Rahman et al. |
| 2021/0051530 A1 | 2/2021 | Venkataraman et al. |
| 2021/0160666 A1 | 5/2021 | Zaifuddin |
| 2021/0182807 A1 | 6/2021 | Akuon et al. |
| 2022/0141260 A1* | 5/2022 | Yao ................. H04L 51/043 709/206 |
| 2023/0012008 A1* | 1/2023 | Li ..................... H04M 3/42034 |

* cited by examiner

CROSS-DOMAIN ROUTING BASED ON SESSION INITIATION PROTOCOL INFORMATION

BACKGROUND

Telephone calls are routed across a network of switching systems, often owned by different telephone carriers. Traditionally, different telephone carriers operate independently from each other in respective domains. Calls originated from one carrier to the other are routed via the switching systems.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditionally, telephone carriers operate independently from each other. Calls or messages between users serviced by different carriers are often routed using the conventional circuit-switched-style networks. With the advancement of wireless communication technology, telephone carriers operating in different domains may choose to partner with each other to provide better communication services to users. However, conventional ways of cross-domain routing require the updating of domain name servers—resulting in large delays due to information searches among multiple servers. This patent document discloses techniques that enable cross-domain routing of calls, messages, and/or multimedia content between different carriers without the need to perform any domain name server updates, thereby eliminating the impact to existing systems and reducing routing delay caused by information searches.

Internet Protocol (IP) Multimedia Subsystem

Figure 1:
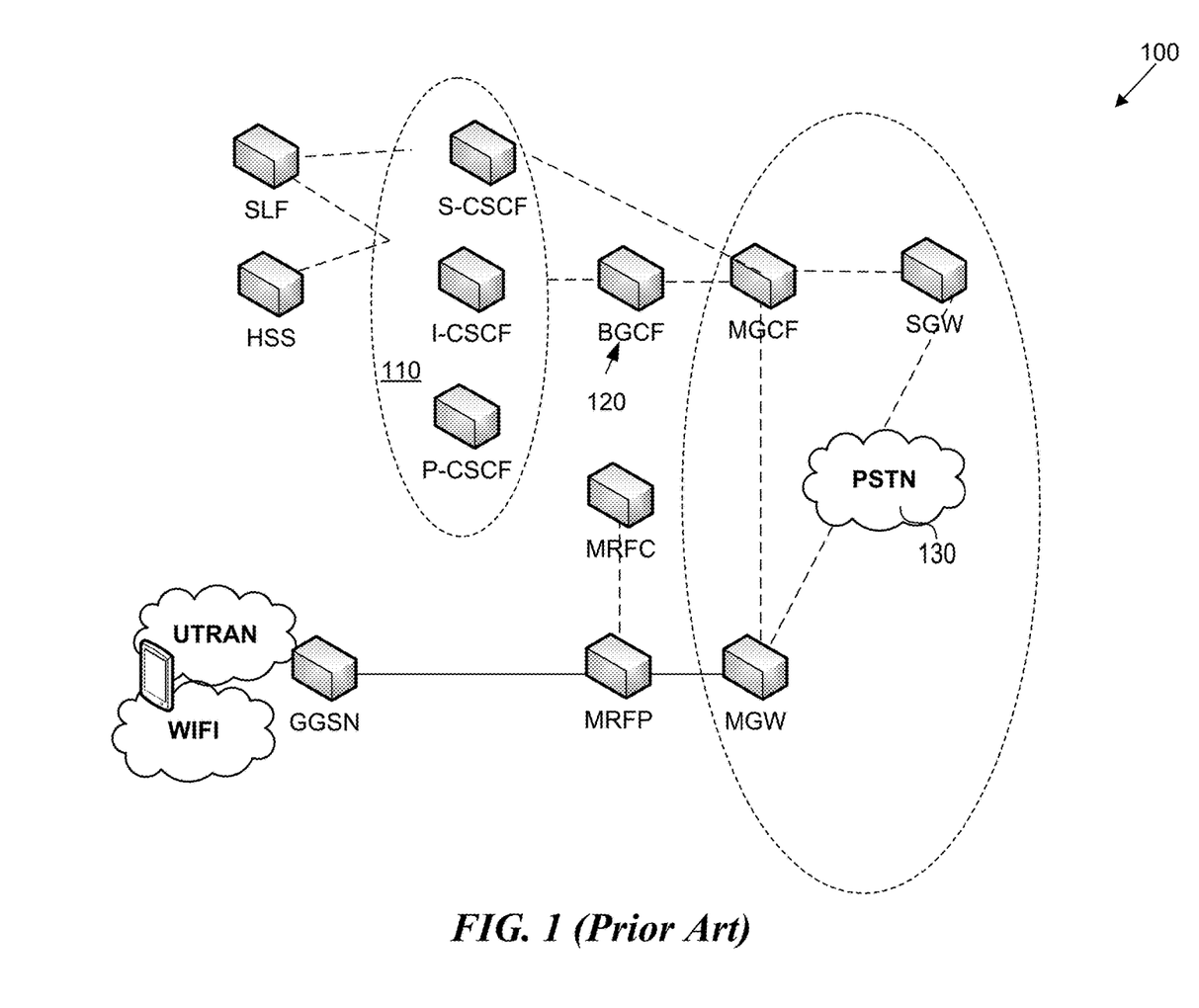
FIG. 1 illustrates an example architecture of the Internet Protocol (IP) Multimedia Subsystem.

Historically, mobile phones have provided voice call services to user over a circuit-switched-style network, such as the public switched telephone network (PSTN), rather than over an IP packet-switched network. To enable delivery of IP multimedia services, the IP Multimedia Subsystem or IP Multimedia Core Network Subsystem (IMS) has been introduced as an architectural framework IP, which uses the Session Initiation Protocol (SIP), a signaling protocol, to initiate, maintain, and terminate real-time sessions that include voice, video and messaging applications. The SIP is used for signaling and controlling multimedia communication sessions in applications of Internet telephony for voice and video calls, in private IP telephone systems, in instant messaging over IP networks as well as voice calling over Long-Term Evolution (VoLTE) or New Radio (VoNR). FIG. 1 illustrates an example architecture 100 of the IMS. Some of the network functions provided by the IMS include:

1. Call Session Control Function (CSCF) 110.

1a. A Proxy-CSCF (P-CSCF) is a SIP proxy that is the first point of contact for the IMS terminal.

1 b. An Interrogating-CSCF (I-CSCF) is another SIP function located at the edge of an administrative domain. Its IP address is published in the Domain Name System (DNS) of the domain so that remote servers can find it, and use it as a forwarding point (e.g., registering) for SIP packets to this domain.

1 c. A Serving-CSCF (S-CSCF) is the central node of the signaling plane.

2. A Breakout Gateway Control Function (BGCF) 120.

The BGCF is a SIP proxy that processes requests for routing from a Serving-Call Session Control Function (S-CSCF) when the S-CSCF has determined that the session cannot be routed using DNS or Electronic Numbering (ENUM) lookups (ENUM)/DNS. It includes routing functionality based on telephone numbers.

3. A PSTN/CS gateway 130.

The PSTN/CS gateway interfaces with PSTN circuit switched (CS) networks.

For a call or message originated from the IMS core, a User Equipment (UE) routes the call or message to CSCF, where the CSCF sends a query to the ENUM/DNS database. If the query to ENUM/DNS database is not successful (e.g., the ENUM/DNS database is not provisioned with the extension information, and/or the destination address is not defined), the SIP call or message is routed to BGCF so that routing can be performed based on telephone numbers.

Support for Cross-Domain Routing

With the development of wireless technology, telephone carriers in different domains can choose to partner with each other to allow part of the communication networks of different carriers to function seamless together. For example, multiple carriers can agree to dedicate one of the carriers to handle a particular subset of services. That is, SIP requests from multiple domains can be routed to the same destination. Furthermore, different types of calls and/or messages can be assigned different classes and/or priorities so that appropriate resources can be allocated. For calls or messages originated from different carriers, the conventional routing mechanisms require re-provisioning of the network nodes and/or the databases to include appropriate routing tables and domain information. The re-provisioning and updating of the network nodes and/or databases often lead to additional complexity and delay, thereby affecting call stability and experience for the users. This patent document discloses techniques that can be implemented in various embodiments to enable network nodes to route SIP-originated calls across different domains using the information carried in the SIP messages. In particular, in some implementations, the disclosed techniques can be implemented in the BGCF to route cross-domain SIP requests, eliminating the need to update the existing ENUM/DNS databases so as to minimize the impact to existing communication systems. That is, carriers can simply establish rules based on the carrier partnership in the BGCF to allow the BGCF to generate modified SIP messages for cross-domain routing. With the operations performed by the BGCF, there is no need to change the existing ENUM/DNS, thereby minimizing the risk of negatively impacting the experience of the existing users of each carrier. When the partnership agreements change, the routing mechanisms can be swiftly adapted again by modifying the BGCF only. Again, no changes are needed in ENUM/DNS, and no additional domain name search cost is added. Furthermore, the disclosed techniques can be implemented to allow the network nodes to provide different routing mechanisms based on the nature of the routing requests and allocate appropriate priorities and/or resources to the requests. Different pricing agreements or special handling of certain service type(s) as agreed by the carriers can be reflected in the SIP messages to enable proper routing and establishment of the communication sessions.

When a calling party initiates a SIP call, the calling party sends a SIP INVITE request, inviting the recipient for a call session. Table 1 shows an example SIP message:

TABLE 1

Example SIP Message

INVITE: sip:bill@solution.com SIP/2.0
FROM: Alicia <sip:alicia@example.com>
TO: Bill sip:bill@solution.com
...

The SIP message starts with the request URI "INVITE: sip:bill@solution.com SIP/2.0." This represents the contact information of the next hop in the call route. The SIP INVITE request also includes the FROM header field that indicates contact information of the initiator of the SIP INVITE request, and the TO header fields that includes the information about the called party or the recipient of the request. The SIP message can further include various other headers that comply with the formatting requirements defined in RFC 3261 of the Internet Engineering Task Force (IETF) standard. For example, extension fields can be added to convey information such as the subscriber account number for billing. The SIP header information can be used by the network nodes to make appropriate routing decisions across different domains/carriers. For example, if multiple carriers established a partnership but have not had the resources to re-provision or update the ENUM/DNS database, the SIP message that is routed to the BGCF can carry useful information in the header to allow the BGCF to route the call or message appropriately.

Figure 2:
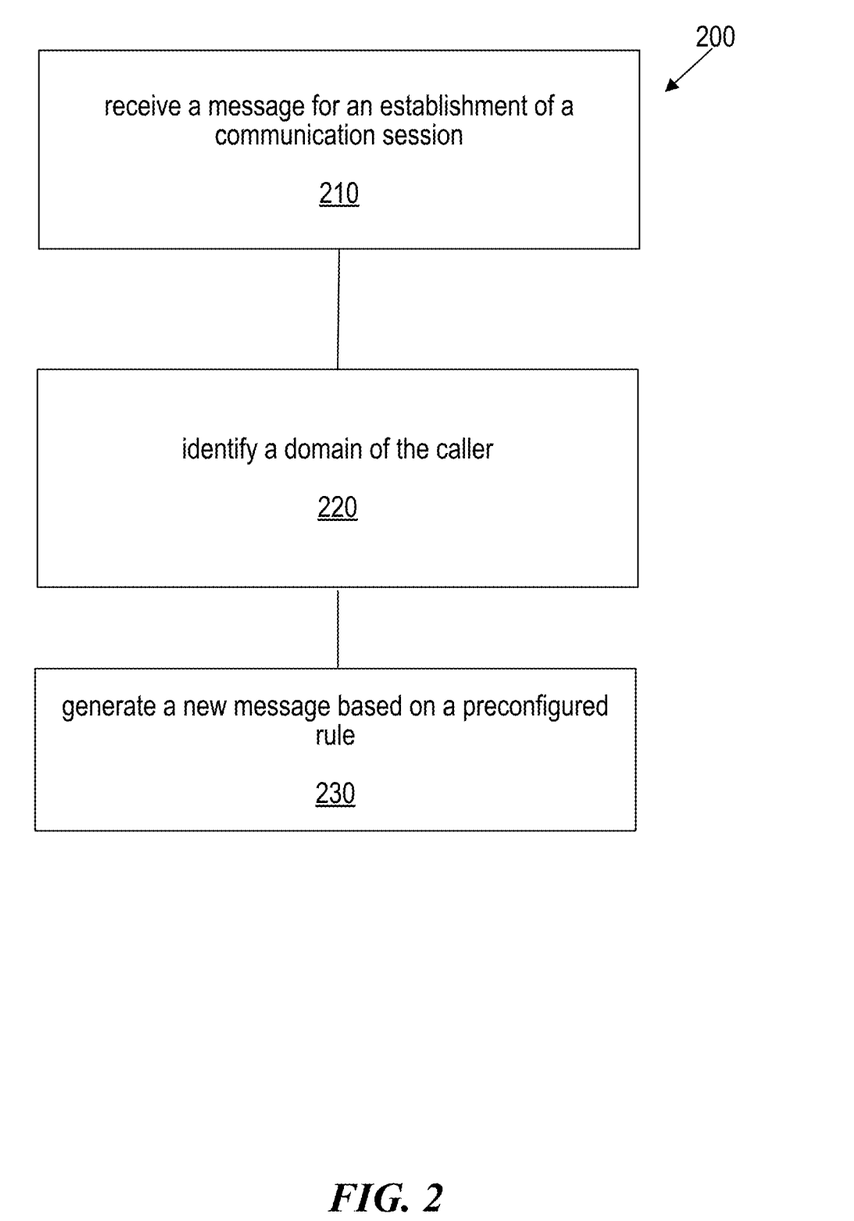
FIG. 2 is a flow chart representation of a method for wireless communication in accordance with one or more embodiments of the present technology.

FIG. 2 is a flowchart of a method 200 for routing a communication session initiated in an Internet Protocol (IP) Multimedia Subsystem (IMS) in accordance with one or more embodiments of the present technology. The method 200 includes, at operation 210, receiving, by a Breakout Gateway Control Function (BGCF) node operating in a first domain, a first message from a caller requesting an establishment of a communication session. It is noted that while the descriptions herein focus on the BGCF node, other network nodes that are capable of breaking out the communication sessions between the circuit-switched network(s) and the packet-switched network(s) can also be used to implement disclosed technology.

Referring back to FIG. 2, the first message can be a Session Initiation Protocol (SIP) INVITE message or other types of SIP messages, such as REGISTER, UPDATE, INFO messages. The method 200 includes, at operation 220, determining, by the BGCF node based on header information of the first message (e.g., the FROM field carried in the header), that the caller is located in a second domain different than the first domain. The method 200 includes, at operation 230, directing, by the BGCF node, the first message to a specific destination server based on a preconfigured rule for the second domain. In some embodiments, the directing of the first message includes generating, by the BGCF node, a second message (e.g., a modified SIP message) based on a preconfigured rule for the second domain. For example, a rule can be preconfigured given the partnership between a first carrier operating in the first domain and a second carrier operating in the second domain. The second message can be generated by adding one or more routing digits that corresponds to a specific destination sever to direct the second message to the specific destination server.

In some embodiments, the preconfigured rule for the second domain specifies that the one or more routing digits corresponds to the specific destination server. For example, a mapping between the routing digit(s) and the destination server(s) can be established to allow the BGCF node to specify where the destination of the message should be.

In some embodiments, the directing of the first message includes comparing a call number of the caller with a set of fraudulent numbers. Upon determining that the call number of the caller is fraudulent (e.g., a spam call), the directing includes generating a response indicating a failure for the establishment of the call session.

In some embodiments, the first message includes information indicating a priority of the call session. Information such as billing information of the call session can be used to determine the priority of the call session (e.g., numbers associated with higher call rates can be assigned higher priorities and allocated more resources). In some embodiments, the method further includes prioritizing, based on the priority of the call session, the first message over other requests for call session establishments.

In another example aspect, a system for providing Internet Protocol (IP) Multimedia services to users includes a first network node (e.g., P-CSCF) configured to receive a request from a caller in a first domain (e.g., a carrier A user) requesting an establishment of a call session. The system also includes a second network node (e.g., BGCF) operating in a second domain (e.g., of carrier B) configured to receive the request originated from the first network node. The second network node is configured to determine, based on header information of the request, that the caller is located in the first domain that is different than the second domain. The second network is configured to generate a new request based on a preconfigured rule for the first domain, and then route the new request to a third network node (e.g., a specific node for incoming carrier A calls in the second domain) to establish the call session. The new request includes one or more routing digits that corresponds to a third network node.

The request can include information indicating a priority of the call session (e.g., premium call services have higher priorities). For example, the second network node can be configured to prioritize the request over other requests for call session establishments based on the priority of the call session. As another example, emergency calls are given the highest priority and be routed first. In some embodiments, the request comprises a Session Initiation Protocol (SIP) INVITE message.

Some examples of the disclosed techniques are further described in the following example embodiments. The examples described here focus on the FROM and Resource Priority headers of the SIP message, but other information carried in carrier-specific extension SIP header fields that comply with RFC 3261 can be used in various scenarios to facilitate the routing of the SIP calls by the BGCF node in the network. Example SIP header fields include, but are not limited to, one or more of the following: Via, Max-Forward, Route, Record-Route, To, Contact, P-Asserted-ID, P-Access-Network-Info, Accept-Contact, User-Agent, P-Visited-Network-ID, or Accept.

Embodiment 1

This embodiment describes example scenarios of delivering calls from a carrier to a specific peer partner based on analysis of the FROM header carried in the SIP message.

Each phone carrier owns a set of phone numbers. Number porting happens when an existing phone number owned by one provider is transferred to another provider. Users can choose to move a phone number from one carrier to another. Alternatively, or in addition, carriers that have an established partnership can choose to port one or more phone numbers among themselves. For each ported telephone number, a Location Routing Number (LRN) is assigned to route calls through the PSTN to the switch serving the ported number. If an LRN is present, the routing is performed based on the LRN, otherwise the call can be directed towards the carrier that owns the number, not the carrier that serves the user.

The routing scheme can also be a combination of the remote routing and local routing. For example, one or more protocols—Terminode Local Routing (TLR) and/or Terminode Remote Routing (TRR)—can be used. The TRR routing scheme is activated when the destination is remote (e.g., for routing calls between carriers) and can be used to allow data to be sent to non-TLR-reachable destination.

Table 2 below shows an example of BGCF routing for a non-ported number:

TABLE 2

An Example of Incoming and Outgoing SIP Messages

Incoming:
INVITE sip:+12132278989@example.com;user=phoneSIP/2.0
ENUM_LRN = none
Outgoing (expected):
INVITE sip:+9998412132278989@example.com;user=phoneSIP/2.0

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming number is not a ported number, so there is no associated LRN in the SIP header. Based on the header information of the incoming SIP INVITE message, the BGCF of carrier B generates an outgoing SIP INVITE message with an alternative routing path for the call, e.g., according to the partnership between the carriers. In particular, one or more routing digits (e.g., 99984) can be added to the SIP INVITE message to assist subsequent routing of the call. For example, the routing digits can allow the SIP INVITE message to be directed to an appropriate network node to complete the establishment of the call session. The correspondence between the routing digits can be determined by the routing carrier (e.g., carrier B) and/or based on agreements between the carriers (e.g., carrier A and carrier B).

In some embodiments, to generate the outgoing SIP INVITE message, the TRR routing scheme can be updated to include information of the FROM field (e.g., +12132278989@example.com) in the incoming SIP header. Because the domain of carrier A (example.com) is different from carrier B (solution.com), additional rule elements can be added in the TRR routing scheme. Furthermore, action elements (e.g., the routing digits) can be added to set the appropriate destination. For example, the destination index for calls from carrier B can be set to Y for default routing, while the destination index for this call from carrier A is set to X. The cross-domain call (e.g., from carrier A to carrier B) can then be routed by the BGCF in a similar manner as calls within the same domain (e.g., from carrier B to carrier B), with different routing paths (e.g., X versus Y).

Table 3 shows another example of BGCF routing for a ported number:

TABLE 3

Another Example of Incoming and Outgoing SIP Messages

Incoming:
INVITE sip:+12062594033;npdi;rn=+12068069999@example.com;user=phoneSIP/2.0
ENUM_LRN = 12068069999
Outgoing (expected):
INVITE sip:+12062594033;npdi;rn=+9998412068069999@example.com;user=phoneSIP/2.0

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming number is a ported number, so there is an associated LRN ("12068069999") in the header. Furthermore, the incoming SIP INVITE message indicates that a query to the Number Portability Data Base has been done (e.g., "npdi"). Based on the header information of the incoming SIP INVITE message, the BGCF of carrier B generates an outgoing SIP INVITE messages with an alternative routing path for the call, e.g., according to the partnership between the carriers. In particular, one or more routing digits (e.g., 99984) can be added to the SIP INVITE message such that the SIP INVITE message is directed to an appropriate network node to complete the establishment of the call session.

In some embodiments, to generate the outgoing SIP INVITE message, the TRR routing scheme can be updated to include information of the FROM field (e.g., +12062594033) in the incoming SIP header. The rule element can indicate that the Routing Number (RN) is used for the ported number. Because the domain of Carrier A (example.com) is different from Carrier B (solution.com), additional rule elements can be added in the TRR routing scheme. Furthermore, action elements (e.g., the routing digits) can be added to set the appropriate destination. For example, the destination index for calls from carrier B can be set to Y for default routing, while the destination index for this call from carrier A is set to X. The cross-domain call (e.g., from carrier A to carrier B) can then be routed by the BGCF in a similar manner as calls within the same domain (e.g., from carrier B to carrier B), with different routing paths (e.g., X versus Y).

Table 4 shows another example of BGCF routing for a ported number:

TABLE 4

Another Example of Incoming and Outgoing SIP Messages

Incoming:
INVITE sip:+14253832103@imcns.spcsdn.net;user=phoneSIP/2.0
ENUM_LRN = 14255540979
Outgoing (expected):
INVITE
sip:+14253832103;npdi;rn=+9998414255540979@imcns.spcsdn.net;user=phoneSIP/2.0

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming number appears to be a non-ported number. However, the ENUM response indicates that there is an associated LRN ("14255540979"). Based on the header information of the incoming SIP INVITE message, the BGCF of carrier B generates an outgoing SIP INVITE messages with an alternative routing path for the call, e.g., according to the partnership between the carriers. For example, the outgoing SIP INVITE message now includes "npdi" to indicate that a query to the Number Portability Data Base has been done. Furthermore, one or more routing digits (e.g., 99984) are added to the SIP INVITE message such that the SIP INVITE message is directed to an appropriate network node to complete the establishment of the call session.

Table 5 shows yet another example of BGCF routing for a ported number:

TABLE 5

Another Example of Incoming and Outgoing SIP Messages

Incoming:
INVITE sip:+14253838313;npdi;rn=+14257986542@imcns.spcsdn.net;user=phoneSIP/2.0
ENUM_LRN = none
Outgoing (expected):
INVITE
sip:+14253838313;npdi;rn=+9998414257986542@imcns.spcsdn.net;user=phoneSIP/2.0

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming number appears to be a ported number with a field "npdi" indicating that a query to the Number Portability Data Base has been done. However, the ENUM response indicates that there is no associated LRN. Based on the header information of the incoming SIP INVITE message, the BGCF of carrier B generates an outgoing SIP INVITE messages with an alternative routing path for the call, e.g., according to the partnership between the carriers. For example, one or more routing digits (e.g., 99984) are added to the SIP INVITE message such that the SIP INVITE message is directed to an appropriate network node to complete the establishment of the call session.

Embodiment 2

This embodiment describes an example scenario of terminating the routing of a message from a carrier to a specific peer partner (e.g., blocking a message) based on analysis of the header information carried SIP message.

Table 6 below shows an example of BGCF routing for a fraudulent or spam number:

TABLE 6

An Example of an SIP Message from a Spam Number

Incoming:
INVITE sip:+12132271212@example.com;user=phoneSIP/2.0
ENUM_LRN = none
Outgoing (expected):
N/A In some embodiments, the BGCF of carrier B (in the domain of solution.com) receives an incoming SIP INVITE message for a message from carrier A (in the domain of example.com). Carrier A has partnered with carrier B such that carrier B handles the routing of at least a subset of the calls and/or messages from carrier A. In particular, carrier A has provided carrier B a set of numbers that have been categorized as fraudulent or spam numbers.

Upon receiving the incoming SIP INVITE message, the BGCF of carrier B can examine the header information and compare with the set of fraudulent or spam numbers. If the number in the FROM field (e.g., +12132271212) has been categorized as a fraudulent or spam number by carrier A, or if at least part of the number matches a spam number pattern, the BGCF does not generate any outgoing SIP INVITE message and sends a response indicating that the communication session for the message cannot be established.

Embodiment 3

This embodiment describes example scenarios of routing calls from a carrier to a specific peer partner based on analysis of the content type and/or resource priority carried in the SIP message.

In wireless communications, Wireless Priority Service (WPS) is a program that authorizes cellular communications service providers to prioritize calls over wireless networks. For example, authorized users can dial *272 on a WPS enabled device to receive calling queue priority. As another example, critical national security and emergency preparedness functions can be granted higher priority as compared to regular communications. Furthermore, certain communication services (e.g., dating call or message services) can be granted higher priority due to higher call rates or agreements reached between the carrier(s). When such communications are initiated, extension headers can be added to the SIP INVITE message to specify that the calls need to be given priorities and/or appropriate network resources should be allocated.

Table 7 below shows an example of BGCF routing for high-priority calls.

TABLE 7

An Example of an SIP Message with High Priority

Incoming:
INVITE sip:+12132275656@example.com;user=phoneSIP/2.0
ENUM_LRN = none
Resource Priority = WPS
Outgoing (expected):
INVITE sip:+12132278989@example.com;user=phoneSIP/2.0
Route: <sip:special-node.sip.example.com>

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming SIP INVITE message indicates that this call is assigned high priority in the Resource Priority header. Alternatively, or in addition, billing information can be included in the extension header fields to indicate that the call is assigned high priority. Based on the header information of the incoming SIP INVITE message, the BGCF of carrier B generates an outgoing SIP INVITE messages with a specific route indicating a network node that is capable of processing such priority messages. In some embodiments, the SIP message with high priority is automatically routed to a dedicated network node that is capable of handling WPS calls and/or messages without the need to generate an additional outgoing SIP message indicating the routing information.

Table 8 below shows another example of BGCF routing for high-priority calls

Incoming:
INVITE sip:+12132275656@example.com;user=phoneSIP/2.0
ENUM_LRN = none
Resource Priority = WPS
Outgoing (expected):
INVITE sip:+9998112132278989@example.com;user=phoneSIP/2.0

In this example, the BGCF of carrier B (in the domain of solution.com) receives an incoming SIP INVITE message for a call from carrier A (in the domain of example.com). Carrier A has partnered with carrier B such that carrier B handles the routing of at least a subset of the calls from carrier A. The incoming SIP INVITE message indicates that this call is assigned high priority in the Resource Priority header. Based on the header information of the incoming SIP INVITE message, the BGCF of carrier B generates an outgoing SIP INVITE messages with an alternative routing path for the call, e.g., according to priority of the call. In particular, one or more special routing digits (e.g., 99981) can be added to the SIP INVITE message to assist subsequent routing of the call. For example, the routing digits can allow the SIP INVITE message to be directed to a specific network node that handles high-priority calls to complete the establishment of the call session.

It is appreciated that the disclosed techniques can enable flexible cross-domain routing between different carriers without the need to re-provisioning or updating the domain databases. The disclosed techniques can also enable the network nodes to provide different routing mechanisms based on the nature of the routing requests (e.g., a request to establish a regular call, a premium call, or a spam call) and allocate appropriate priorities and/or resources to the requests.

Wireless Communications System

Figure 3:
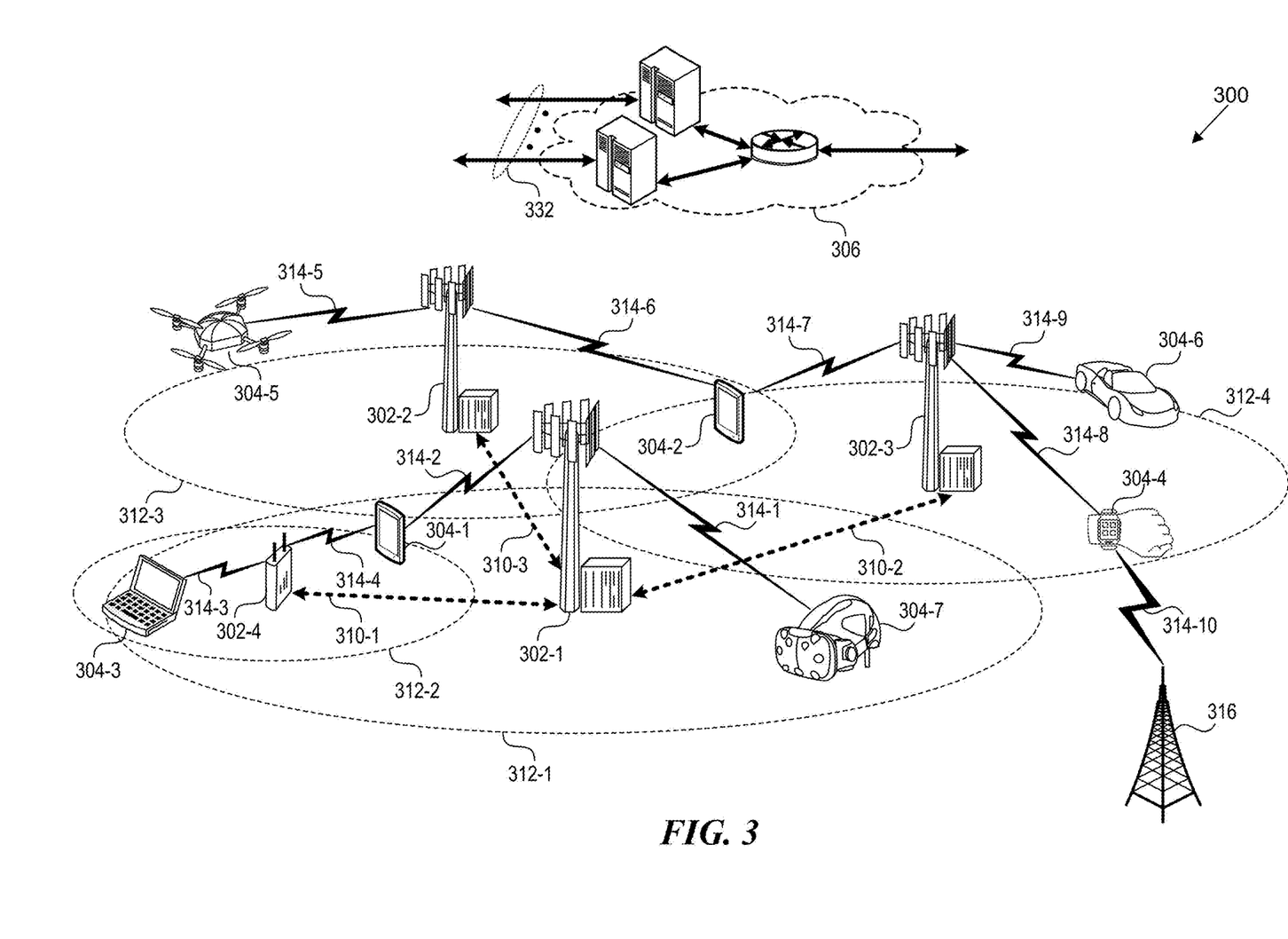
FIG. 3 is a block diagram that illustrates a wireless communications system.

FIG. 3 is a block diagram that illustrates a wireless telecommunication system 300 ("system 300") in which aspects of the disclosed technology are incorporated. The system 300 includes base stations 302-1 through 302-4 (also referred to individually as "base station 302" or collectively as "base stations 302"). A base station is a type of network access node (NAN) that can also be referred to as a cell site, a base transceiver station, or a radio base station. The system 300 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 300 also include wireless devices 304-1 through 304-8 (referred to individually as "wireless device 304" or collectively as "wireless devices 304") and a core network 306. The wireless devices 304-1 through 304-8 can correspond to or include network entities capable of communication using various connectivity standards. For example, a 5G communication channel can use millimeter wave (mmW) access frequencies of 28 GHz or more. In some implementations, the wireless device 304 can operatively couple to a base station 302 over a Long-Term Evolution (LTE)/LTE Advanced (LTE-A) communication channel, which is referred to as a 4G communication channel. In some implementations, the base station 302 can provide network access to a Fifth-Generation (5G) communication channel.

The core network 306 provides, manages, and controls security services, user authentication, access authorization, tracking, Internet Protocol (IP) connectivity, and other access, routing, or mobility functions. The base stations 302 interface with the core network 306 through a first set of backhaul links 308 (e.g., S1 interfaces) and can perform radio configuration and scheduling for communication with the wireless devices 304 or can operate under the control of a base station controller (not shown). In some examples, the base stations 302 can communicate, either directly or indirectly (e.g., through the core network 306), with each other over a second set of backhaul links 310-1 through 310-3 (e.g., X1 interfaces), which can be wired or wireless communication links.

The base stations 302 can wirelessly communicate with the wireless devices 304 via one or more base station antennas. The cell sites can provide communication coverage for geographic coverage areas 312-1 through 312-4 (also referred to individually as "coverage area 312" or collectively as "coverage areas 312"). The geographic coverage area 312 for a base station 302 can be divided into sectors making up only a portion of the coverage area (not shown). The system 300 can include base stations of different types (e.g., macro and/or small cell base stations). In some implementations, there can be overlapping geographic coverage areas 312 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 300 can include a 5G network and/or an LTE/LTE-A or other network. In an LTE/LTE-A network, the term eNB is used to describe the base stations 302 and in 5G new radio (NR) networks, the term gNBs is used to describe the base stations 302 that can include mmW communications. The system 300 can thus form a heterogeneous network in which different types of base stations provide coverage for various geographical regions. For example, each base station 302 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 304 and the base stations 302 or core network 306 supporting radio bearers for the user plane data. At the Physical (PHY) layer, the transport channels are mapped to physical channels.

As illustrated, the wireless devices 304 are distributed throughout the system 300, where each wireless device 304 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 304-1 and 304-2), a tablet computer, a laptop computer (e.g., wireless device 304-3), a wearable (e.g., wireless device 304-4). A wireless device can be included in another device such as, for example, a drone (e.g., wireless device 304-5), a vehicle (e.g., wireless device 304-6), an augmented reality/virtual reality (AR/VR) device such as a head-mounted display device (e.g., wireless device 304-7), an IoT device such as an appliance in a home (e.g., wireless device 304-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 314-1 through 314-11 (also referred to individually as "communication link 314" or collectively as "communication links 314") shown in system 300 include uplink (UL) transmissions from a wireless device 304 to a base station 302, and/or downlink (DL) transmissions, from a base station 302 to a wireless device 304. The downlink transmissions can also be called forward link transmissions while the uplink transmissions can also be called reverse link transmissions. Each communication link 314 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 314 can transmit bidirectional communications using FDD (e.g., using paired spectrum resources) or TDD operation (e.g., using unpaired spectrum resources). In some implementations, the communication links 314 include LTE and/or mmW communication links.

In some implementations of the system 300, the base stations 302 and/or the wireless devices 304 include multiple antennas for employing antenna diversity schemes to improve communication quality and reliability between base stations 302 and wireless devices 304. Additionally, or alternatively, the base stations 302 and/or the wireless devices 304 can employ multiple-input, multiple-output (MIMO) techniques that can take advantage of multi-path environments to transmit multiple spatial layers carrying the same or different coded data.

Computer System

Figure 4:
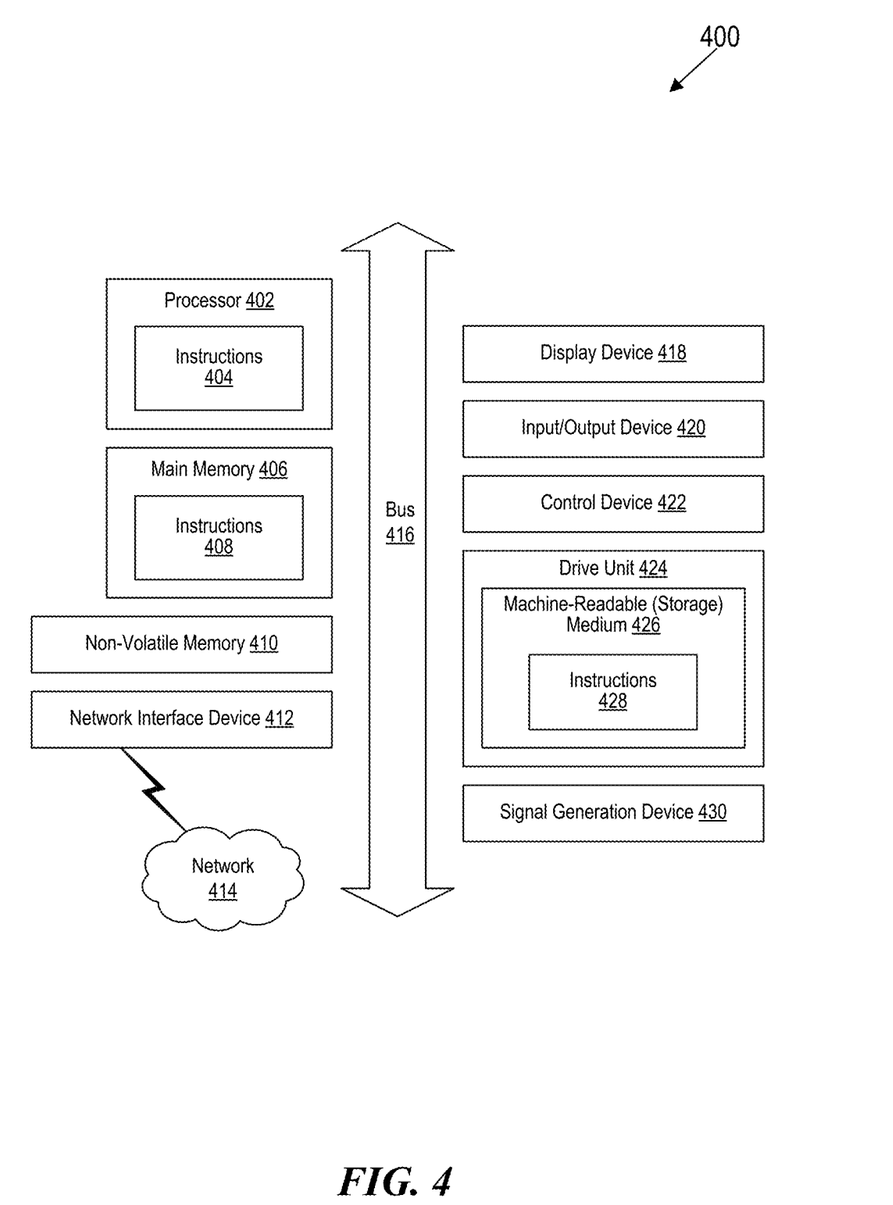
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 930 that are communicatively connected to a bus 416. The bus 416 represents one or more physical buses and/or point-to-point connections that are connected by appropriate bridges, adapters, or controllers. Various common components (e.g., cache memory) are omitted for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

Any patents and applications and other references noted above, and the assignee's concurrently filed U.S. patent application Ser. No. 17/530,367, filed Nov. 18, 2021, and entitled BREAKOUT GATEWAY CONTROL FUNCTION NUMBER MODIFICATION BASED ON SIP INVITE HEADER INFORMATION, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for routing a communication session initiated in an Internet Protocol (IP) Multimedia Subsystem (IMS), comprising:
   receiving, by a Breakout Gateway Control Function (BGCF) node operating in a first domain, a first message from a caller requesting an establishment of a call session;
   determining, by the BGCF node based on header information of the first message, that the caller is located in a second domain different than the first domain; and
   directing, by the BGCF nodes, without a Call Session Control Function (CSCF) network server querying an Electronic Numbering (ENUM) server, the first message to a specific destination server to complete the establishment of the call session based on a preconfigured rule,
   wherein the preconfigured rule represents an agreement between a first carrier of the first domain and a second carrier of the second domain, the agreement indicating that a subset of calls from the second domain is routed by the first domain,
   wherein the directing comprises, upon determining that a call number of the caller is valid:
      determining, by the BGCF node, whether the call number of the caller is a ported number, and
      generating, by the BGCF node, a second message based on the preconfigured rule, wherein the second message comprises a routing number field formed by adding one or more routing digits to (1) the call number carried in the first message in response to the call number not being a ported number, or (2) a local routing number assigned to the caller in case the call number being a ported number.

2. The method of claim 1, wherein the preconfigured rule specifies that the one or more routing digits corresponds to the specific destination server.

3. The method of claim 1, wherein the directing the first message comprises:
   comparing the call number of the caller with a set of fraudulent numbers, and
   upon determining that the call number of the caller is fraudulent, generating a response indicating a failure for the establishment of the communication session.

4. The method of claim 1, wherein the first message includes information indicating a priority of the communication session.

5. The method of claim 4, wherein the information includes billing information of the communication session.

6. The method of claim 1, wherein the first message comprises a Session Initiation Protocol (SIP) INVITE message.

7. The method of claim 1, comprising:
   combining a Terminode Local Routing (TLR) protocol and a Terminode Remote Routing (TRR) protocol for the routing of the communication session.

8. A device configured to operate in a first domain to route a call initiated in an Internet Protocol (IP) Multimedia Subsystem (IMS), the device comprising at least one processor that is configured to:
   receive a first message from a caller requesting an establishment of a communication session;
   determine, based on header information of the first message, that the caller is located in a second domain different than the first domain; and direct, without a Call Session Control Function (CSCF) network server querying an Electronic Numbering (ENUM) server, the first message to a specific destination server to complete the establishment of the communication session based on a preconfigured rule, wherein the preconfigured rule represents an agreement between a first carrier of the first domain and a second carrier of the second domain, the agreement indicating that a subset of calls from the second domain is routed by the first domain, wherein the at least one processor is configured to, upon determining that a call number of the caller is valid:

determine whether the call number of the caller is a ported number, and generate a second message based on the preconfigured rule, wherein the second message comprises a routing number field formed by adding one or more routing digits to (1) the call number carried in the first message in response to the call number not being a ported number, or (2) a local routing number assigned to the caller in response to the call number being a ported number.

9. The device of claim 8, wherein the preconfigured rule specifies that the one or more routing digits corresponds to the specific destination server.

10. The device of claim 8, wherein the at least one processor is further configured to:

compare the call number of the caller with a set of fraudulent numbers, and upon determining that the call number of the caller is fraudulent, generate a response indicating a failure for the establishment of the communication session.

11. The device of claim 8, wherein the device is Breakout Gateway Control Function (BGCF) node operating in the first domain.

12. The device of claim 8, wherein the first message includes information indicating a priority of the communication session.

13. The device of claim 8, wherein the first message comprises a Session Initiation Protocol (SIP) INVITE message.

14. The device of claim 8, wherein the at least one processor is configured to:

determine whether the local routing number is present for the caller.

15. A system for providing Internet Protocol (IP) Multimedia services to users, comprising:

a first network node configured to receive a request from a caller in a first domain requesting an establishment of a communication session; and a second network node operating in a second domain configured to receive the request originated from the first network node, wherein the second network node is configured to:

determine, based on header information of the request, that the caller is located in the first domain that is different than the second domain, generate, without a Call Session Control Function (CSCF) network server querying an Electronic Numbering (ENUM) server, a new request based on a preconfigured rule, wherein the preconfigured rule represents an agreement between a first carrier of the first domain and a second carrier of the second domain, the agreement indicating that a subset of calls from the first domain is routed by the second domain, wherein the new request includes a routing number field formed by adding one or more routing digits that corresponds to a third network node to (1) a call number carried in the request in response to the call number not being a ported number or (2) a local routing number assigned to the caller in response to the call number being a ported number, and route the new request to the third network node to establish the communication session.

16. The system of claim 15, wherein the first network node comprises a Proxy Call Session Control Function node.

17. The system of claim 15, wherein the second network node comprises a Breakout Gateway Control Function node.

18. The system of claim 15, wherein the request includes information indicating a priority of the communication session.

19. The system of claim 18, wherein the second network node is configured to prioritize the request over other requests for communication session establishments based on the priority of the communication session.

20. The system of claim 15, wherein the request comprises a Session Initiation Protocol (SIP) INVITE message.

* * * * *